United States Patent
Spotnitz (12)

(10) Patent No.: US 6,180,280 B1
(45) Date of Patent: Jan. 30, 2001

(54) TRILAYER BATTERY SEPARATOR

(75) Inventor: Robert M. Spotnitz, Charlotte, NC (US)

(73) Assignee: Celgard Inc., Charlotte, NC (US)

( * ) Notice: Under 35 U.S.C. 154(b), the term of this patent shall be extended for 0 days.

(21) Appl. No.: 09/041,163

(22) Filed: Mar. 12, 1998

(51) Int. Cl.$^7$ ...................................................... H01M 2/14
(52) U.S. Cl. ............................................. 429/62; 429/145
(58) Field of Search ............................ 429/62, 144, 145

(56) References Cited

U.S. PATENT DOCUMENTS

| | | |
|---|---|---|
| 4,247,498 | 1/1981 | Castro . |
| 4,539,256 | 9/1985 | Shipman . |
| 4,650,730 | 3/1987 | Lundquist et al. . |
| 4,731,304 * | 3/1988 | Lundquist et al. ..................... 429/62 |
| 5,281,491 | 1/1994 | Rein et al. . |
| 5,565,281 | 10/1996 | Yu et al. . |
| 5,691,047 * | 11/1997 | Kurauchi et al. ................. 428/315.7 |
| 5,691,077 * | 11/1997 | Yu ........................................... 429/62 |

FOREIGN PATENT DOCUMENTS

| | | |
|---|---|---|
| 2 298 817 | 9/1996 | (GB) . |
| 7-307146 | 11/1995 | (JP) . |
| 96250097 | 9/1996 | (JP) . |

OTHER PUBLICATIONS

U.S. application Ser. No. 08/896,513, filed Jun. 22, 1997 entitled *Ultra–thin, Single–ply Battery Separator;* Inventor: Wei–Ching Yu; application consisting of 27 pages and 2 sheets of drawings.

U.S. Continuation application Ser. No. 08/650,210; filed May 20, 1996 entitled *Shutdown, Trilayer Battery Separator;* Inventor: Wei–Ching Yu; application consisting of 27 pgs. and 2 sheets of drawings.

* cited by examiner

*Primary Examiner*—Stephen Kalafut
*Assistant Examiner*—M. Wills
(74) *Attorney, Agent, or Firm*—Robert H. Hammer, III

(57) ABSTRACT

A trilayer shutdown battery separator is provided having two microporous strength layer membranes sandwiching one microporous shutdown layer membrane. The strength layers are made by a stretch method. The shutdown layer is made by a phase inversion method. The preferred method of making such a trilayer separator comprises: making microporous strength layers by a stretch method; forming a microporous shutdown layer by phase inversion process; and bonding two microporous strength layers and one microporous shutdown layer into the trilayer battery separator.

9 Claims, 1 Drawing Sheet

TRILAYER BATTERY SEPARATOR

FIELD OF THE INVENTION

The invention is directed to a trilayer shutdown battery separator, and the method of making same.

BACKGROUND OF THE INVENTION

A battery normally comprises electrodes, electrolyte, and battery separators. Battery separators are located between adjacent anodes and cathodes in a battery to prevent direct contact between electrodes of opposite polarity and to contain electrolyte.

In lithium batteries (e.g., lithium ion or lithium secondary battery) which are increasingly popular, short-circuiting is a problem as it tends to cause thermal runaway and even explosion. Thus, shutdown separators have been developed to cope with this problem. (see, e.g., U.S. Pat.. No. 4,650,730 and U.S. Pat. No. 4,731,304 both issued to Lundquist et al.) A shutdown battery separator is a microporous membrane which closes its pores at some temperature well below the melting and/or ignition point of lithium to minimize the negative impact of thermal runaway.

Microporous membranes made of polymers such as polypropylene which give rise to higher puncture strength often have a high melting temperature, near the melting point of lithium, which is a drawback for using these polymers to form shutdown separators for lithium batteries. On the other hand, microporous membranes made of polymers such as polyethylene have low melting temperatures. But their puncture strength is generally low. Thus, trilayer shutdown batteries have been proposed comprising two microporous polypropylene membranes sandwiching a polyethylene membrane.

Japanese Patent Application No. 98395/1994 (JP7-304110A) filed May 12, 1994 by Ube Industries, Ltd. discloses a microporous trilayer battery separator having a polypropylene-polyethylene-polypropylene construction. The trilayer battery separator has a pore-closing shutdown temperature of 135 to 140° C. The process of preparing the separator includes the steps of: extruding a polypropylene non-porous precursor; extruding a polyethylene non-porous precursor; forming the polypropylene-polyethylene-polypropylene non-porous trilayer precursor; bonding the trilayer precursor together; heat-treating (annealing) the bonded precursor; and stretching the bonded, annealed precursor to form the porous, trilayer separator.

U.S. patent application Ser. No. 359,772 filed Dec. 20, 1994 by Hoechst Celanese Corporation also teaches a trilayer battery separator having a polypropylene-polyethylene-polypropylene construction. The shutdown temperature given in the example is 132° C. The process for making the trilayer battery separator includes the steps of: forming a porous polypropylene precursor; forming a porous polyethylene precursor; forming a porous trilayer precursor; and bonding the porous trilayer precursor to form the trilayer battery separator.

UK Patent publication No. GB 2,298,817 describes a microporous trilayer battery separator made by co-extruding a trilayer film precursor having a non-porous polypropylene-polyethylene-polypropylene construction, annealing the trilayer precursor, and then stretching the annealed trilayer precursor to form the porous trilayer battery separator. The separator has a shutdown temperature of 135° C. as given in the examples.

A porous trilayer separator proposed in Japanese Patent Application No. 56320/1995 (JP8-250097A) filed by Kureha Chemical Industry Co. Ltd., is purported to have a shutdown temperature in the range of from 100° C. to 150° C. However, in the working examples, the shutdown temperature of the trilayer separators is 124° C. The Kureha separator is prepared by a process that includes the steps of: co-extruding a trilayer precursor which contains, e.g., a solvent extractable material as pore forming aid, and forming pores in the precursor by solvent extraction of the precursor.

A microporous shutdown separator should be thin enough to minimize the space it occupies in the battery and to reduce electrolytic resistance. Nevertheless the shutdown separator must also have sufficient strength to resist splitting and puncture. Although these two attributes, i.e., thinness and strength, are each very important, the two cannot be maximized since film strength typically varies inversely with film thickness. Moreover, it is also desirable to provide a separator having a shutdown temperature lower than 120° C., preferably within the range of from about 95° C. to about 115° C., while having a higher temperature at which the integrity of the separator can be maintained. As discussed above, the previously disclosed trilayer shutdown separators all have a shutdown temperature higher than 120° C. This is largely because the methods heretofore known for lowering shutdown temperature either compromise separator thinness or substantially weaken separator strength and interfere with the ability to manufacture the separator. Consequently, there has not been available in the art a trilayer separator having a shutdown temperature of lower than 120° C. while still possessing satisfactory thinness as well as sufficient strength. Thus, there is further need for high quality battery separators.

SUMMARY OF THE INVENTION

The three desirable features, i.e., satisfactory thinness, sufficient strength, and relatively low shutdown temperature, are achieved in the trilayer shutdown battery separator provided in the present invention. The battery separator of this invention has two microporous strength layers sandwiching an inner microporous shutdown layer. The microporous inner layer is formed by a phase inversion method while the strength layers are made by stretch method. Preferably, the thickness of the trilayer separator is no greater than about 2 mils, and more preferably no greater than about 1 mil. Preferably, the trilayer separator has a shutdown temperature of lower than about 124° C., more preferably within the range of from about 80° C. to about 120° C., even more preferably from about 95° C. to about 115° C. Methods of making the trilayer shutdown separator are also provided. A preferred method comprises the following steps: (a) extruding non-porous strength layer precursors; (b) annealing and stretching the non-porous precursor to form microporous strength layers; (c) forming a microporous inner layer by a phase inversion process which comprises extruding a non-porous shutdown layer precursor from a composition comprising a polymer and extractable materials, extracting the extractable materials from the precursor to form a microporous structure, stretching the membrane to orient the microporous membrane; and (d) bonding the precursors into a trilayer battery separator wherein the first and third layers are strength layers, and the second layer is said microporous membrane made by a phase inversion method.

The trilayer battery separator provided in this invention has sufficient strength and low shutdown temperature while its thinness is not sacrificed. Thus, it is particularly suitable for use in batteries, such as lithium secondary batteries.

DETAILED DESCRIPTION OF THE INVENTION

Figure 1:
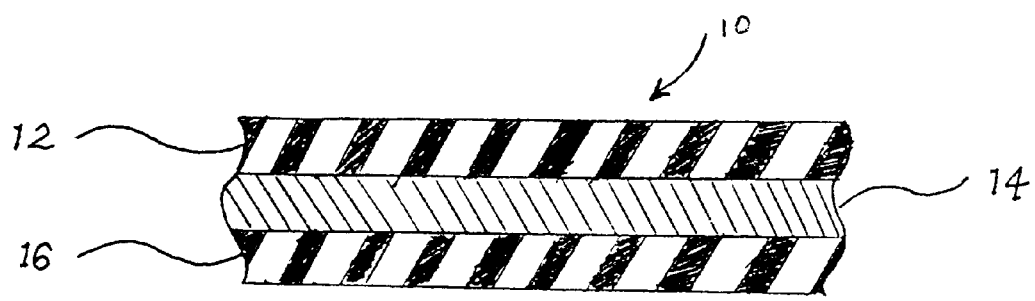
FIG. 1 is a schematic diagram illustrating the three-layer construction of the trilayer battery separator of the present invention.

The present invention relates to a trilayer shutdown battery separator comprising two strength layers sandwiching one shutdown layer. The shutdown inner layer is formed by a phase inversion method as discussed in greater detail below. The strength layers are made by a stretch method.

FIG. 1 illustrates a preferred embodiment of shutdown battery separator 10 which comprises a trilayer microporous film for use in electrochemical cells, e.g., batteries, particularly rechargeable batteries, such as lithium ion batteries. This trilayer separator has three microporous membranes bonded together. The first (12) and third (16) layers, i.e., the two outer layers, are strength layers. The second (14) layer, i.e., the inner layer, is a shutdown layer.

The shutdown layer is capable of melting and closing the pores at a temperature (shutdown temperature) below the melting point of the strength layers and substantially below the temperature at which thermal runaway can occur. Preferably, the battery separator of the present invention has a shutdown temperature of less than 124° C., more preferably within the range of from about 80° C. to about 120° C., even more preferably from about 95° C. to about 115° C., and most preferably is about 110° C.

In accordance with the present invention, the thickness of the trilayer is no greater than 2.0 mils, preferably no greater than 1.5 mils, most preferably no more than 1.0 mil.

Therefore, the trilayer battery separator of this invention exhibits a low shutdown temperature while still possessing satisfactory thinness as well as sufficient strength.

The strength layers can be composed of, for example, a polyolefin such as polypropylene or polyethylene, or a blend comprising substantially polypropylene or polyethylene or copolymer thereof. Preferably, polypropylene or a blend formed substantially entirely of polypropylene (e.g., 95% by weight of polypropylene or greater) is used as the polymer forming the film. An exemplary polypropylene is Fina PP 3271 resin commercially available from Fina Oil and Chemical Company, Dallas Tex.

Broadly speaking, the strength layers of the battery separator are preferably made by a stretch method. By "stretch method" is intended any method of making microporous film in which the micropores are formed by stretching/orienting the precursor film. The preferred stretch method for making the outer strength layers comprises extruding, e.g., a polypropylene polymer or copolymer to form a membrane, annealing the membrane, and stretching the annealed membrane to render the membrane microporous.

By way of non-limiting example, suitable methods include the stretch methods disclosed in U.S. patent application Ser. No. 08/896,513 filed Jun. 22, 1997 and U.S. patent application Ser. No. 08/650,210 filed May 20, 1996 (both of which were filed by the assignee of the present application and are incorporated herein by reference), and the modified stretch methods (particle stretch) taught in U.S. Pat. No. 3,870,593 to Elton and U.S. Pat. No. 4,350,655 to Hoge (both of which are incorporated herein by reference). Other suitable examples for this purpose include but not limited to the methods disclosed in U.S. Pat. Nos. 3,426,754; 3,588,764; 3,679,538; 3,801,404; 3,801,692; 3,843,761; 3,853,601; 4,138,459; 4,539,256; 4,726,989; 4,994,335; and 5,565,281, each of which is incorporated herein by reference. In particular, the improved methods for making thinner membranes disclosed in U.S. patent application Ser. No. 08/650,210 and U.S. patent application Ser. No. 08/896,513 are preferred.

The inner shutdown layer of the present invention is made by a phase inversion method. The preferred phase inversion method for making the inner layer of this invention is the one that is disclosed in, for example, U.S. Pat. No. 4,247,498, which is incorporated herein by reference. Other suitable phase inversion methods include but not limited to those disclosed in U.S. Pat. No. 4,539,256 to Shipman, U.S. Pat. No. 4,726,989 to Mrozinski, and U.S. Pat. No. 5,281,491 to Rein et al. Each of the foregoing is incorporated herein by reference.

Typically, in a phase inversion method, a membrane can be formed from a composition comprising a polymer and an extractable material. The extractable material is selected such that it is miscible with the polymer at least at the melting point of the polymer. Thus, in this process, the composition is heated to the melting temperature of the polymer to form a homogenous phase. A membrane is then extruded from the homogenous liquid composition. Phase separation occurs between the polymer and the extractable material as the membrane is extruded and while the temperature is lowered down. The extractable material may be extracted from the membrane by a suitable solvent which dissolves the extractable material but not the polymer thus forming a microporous structure in the membrane.

Optionally, in the composition described above, other additives such as stabilizers, antioxidants, and the like can also be included. In addition, nucleating agents such as those disclosed in U.S. Pat. No. 4,726,989 to Mrozinski may also be employed to promote crystallization of the polymer. As is disclosed in U.S. Pat. No. 4,726,989 to Mrozinski, such nucleating agents allow greater amount of the extractable material to be added and increase the porosity and tensile strength of the phase inversion membrane.

In addition, either before or after the removal of the extractable material, the extruded membrane in the phase inversion method may be oriented or stretched beyond its elastic limit so as to impart a permanent structure of a network of interconnected micropores. Any method of stretching known in the art may be suitable for this invention. Stretching can be in an uniaxial or transverse direction.

U.S. Pat. No. 4,247,498 (which is incorporated herein by reference) describes compositions employed for forming a microporous membrane by phase inversion. U.S. Pat. Nos. 4,539,256; 4,650,730; 4,726,989; and 5,281,491 (all of which are incorporated herein by reference) also disclose compositions used for making membranes by phase inversion processes. The compositions in all above patents can be employed for making the inner shutdown layer of this invention, provided that modifications be made to provide a lower shutdown temperature as specified below.

A variety of polymers capable of forming microporous film may be used for making the inner layer with a phase inversion method. Examples of such polymer include, but not limited to, polyolefins, polysulfones, polyvinyl chloride, polyvinyl fluoride, polytetrafluoroethylene-polystyrene copolymers, polyamides, polyphenyleneoxide-polysterene copolymers, polycarbonates and the like. Preferably, polyolefins are used. Exemplary polyolefins include but not limited to polypropylene, polyethylene, ethylene-butene copolymers, ethylene-hexene copolymers, ethylenemetacrylate copolymers, and blends comprising substantially one of the above compounds. Preferably, polymers are chosen such that the shutdown temperature falls within the range of from about 80° C. to about 120° C., preferably from about 95° C. to about 115° C. To achieve lower shutdown temperatures, it is preferred to use low density polyethylene, or a blend comprising substantially low density polyethylene. More preferably linear low density polyethylene (LLDPE) such as copolymers of ethylene-butene or copolymers of ethylene-hexene should be used for separators with a shutdown temperature of about 100° C. Fillers are optional in the composition. The extractable material used must satisfy the following conditions: (1) it must be a liquid miscible with the polymer at an elevated temperature, e.g., at the extrusion temperature; (2) it must be soluble in a solvent in which the polymer is not soluble so that it can be extracted from the polymer membrane to form a microporous structure in the membrane. Feasible extractable materials include but not limited to aromatic dicarboxylic acid esters of $C_3$–$C_5$ alkyl alcohols and $C_6$–$C_9$ alkanyl dicarboxylic acid esters of $C_3$–$C_5$ alkyl alcohols. Preferably, dibutyl sebacate is used when copolymer ethylene-butene is the polymer.

For removal of the extractable material from the membrane, many solvents known in the art can be used. The solvent should be chosen such that the structure and content of the polymeric membrane is not affected while the extractable material is removed.

In one embodiment of the invention, the microporous shutdown layer is formed separately from the strength layers by the following steps: (a) heating a mixture of a thermoplastic polymer such as polyethylene and a compatible liquid or solid to form a homogenous solution; (b) casting or extruding the solution into the shape of a membrane; (c) cooling the solution in the desired shape to allow thermodynamic phase separation and solidification; (d) extracting the extractable liquid or solid material which is in a separate phase from the solid polymer to form a microporous membrane.

Alternatively, in another embodiment of the present invention, the inner shutdown layer can be formed as coating on a preformed microporous strength layer. In this method, the inner layer is extruded directly onto a microporous strength layer. The subsequent extraction step is performed on the inner layer coated on the strength layer. The solvent selected must not adversely affect the structure and content of the strength layer. After the extraction step, another microporous strength layer is laminated onto the inner layer and the trilayer precursor is bonded into a trilayer battery separator as described below.

After the microporous outer layer and microporous inner layer are made, the microporous membranes are bonded together into a trilayer battery separator having a structure as shown in FIG. 1. The bonding methods are generally known in the art. Suitable methods for use in this invention include but not limited to calendaring, adhering with adhesives, and welding. The application of adhesives may include: air atomizing; gravure/screen printing; hydraulic spraying; and ultrasonic spraying. The choice of adhesive and the rate of adhesive application must be chosen so that the separator's porosity is not adversely effected. The welding techniques includes but not limited to thermal welding and ultrasonic welding. The amount of energy for the welding procedure and the pattern of weld should be chosen so that the separator's porosity is not adversely effected. Preferably bonding is done by calendaring, with nips closed, at a temperature of at least 1° C. below the melting point of the inner shutdown layer, more preferably a temperature of at least 5° C. below the melting point of the inner shutdown layer.

Optionally, a cross-plied trilayer battery separator can be made by cross-ply laminating the microporous layers such that one strength layer is angularly oriented relative to the other strength layer. Methods of making cross-ply microporous battery separator are disclosed in U.S. Pat. No. 5,667,911, which is incorporated herein by reference.

After bonding, the trilayer shutdown battery separator is rewound for use in the manufacture of batteries, particularly secondary lithium batteries, as is well known in the art.

All publications and patent applications mentioned in the specification are indicative of the level of those skilled in the art to which this invention pertains. All publications and patent applications are incorporated herein by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

That which is claimed is:

1. A battery separator comprising a first and third microporous strength layer sandwiching a shutdown layer, said shutdown layer being a microporous membrane made by a phase inversion process, and said strength layers being made by a stretch method.

2. A battery separator of claim 1, wherein said battery separator has a shutdown temperature of about 110° C.

3. A battery separator of claim 1, wherein said battery separator has a thickness of no greater than one mil.

4. A battery separator of claim 1, wherein said strength layer is made of polypropylene and said shutdown layer is made of linear low density polyethylene.

5. A method of making a trilayer battery separator comprising:

forming microporous strength layer membranes by a stretch method;

forming a microporous shutdown layer membrane by a phase inversion method;

bonding said strength layer membranes and said shutdown layer membrane to form the trilayer battery separator having the first and third microporous strength layer membranes and the second microporous shutdown layer membrane.

6. A method of making a trilayer battery separator according to claim 5, wherein said battery separator has a shutdown temperature of no greater than about 110° C.

7. A method of making a trilayer battery separator according to claim 5, wherein said battery separator has a thickness of no greater than one mil.

8. A method of making a trilayer battery separator according to claim 5, wherein said strength layer is made of polypropylene and said shutdown layer is made of linear low density polyethylene.

9. A method of making a trilayer battery separator according to claim 5, wherein said microporous shutdown layer membrane is formed by extruding a shutdown layer precursor onto one layer of said microporous strength layer membrane and extracting said shutdown layer precursor thereon.

* * * * *